United States Patent [19]

Goldberg et al.

[11] Patent Number: 4,847,122

[45] Date of Patent: * Jul. 11, 1989

[54] CAVITATION-RESISTANT POLYMER AND COATING

[75] Inventors: Daniel Goldberg, Bordentown, N.J.; G. Fred Lauman, Chalfont, Pa.

[73] Assignee: Palmer International, Inc., Wocester, Pa.

[ * ] Notice: The portion of the term of this patent subsequent to Jun. 28, 2005 has been disclaimed.

[21] Appl. No.: 54,542

[22] Filed: May 27, 1987

[51] Int. Cl.$^4$ ............... C08L 63/00; C08L 75/04; C09D 5/04; C09D 5/00

[52] U.S. Cl. .................... 427/410; 523/455; 523/456; 523/466; 523/443; 523/175

[58] Field of Search ............ 528/45; 523/455, 466, 523/456, 443; 427/410

[56] References Cited

U.S. PATENT DOCUMENTS

| | | |
|---|---|---|
| 3,174,977 | 3/1965 | Holberg et al. ............ 260/31.8 |
| 3,316,185 | 4/1967 | Reinking . | |
| 3,352,813 | 11/1967 | Hayes ..................... 260/31.8 |
| 3,645,969 | 2/1972 | Harvey ................... 260/47 EN |
| 4,284,745 | 8/1981 | Meyer ..................... 528/45 |
| 4,383,061 | 5/1983 | Neal, Jr. et al. ............ 523/458 |
| 4,409,380 | 10/1983 | Holubka .................. 528/45 |
| 4,435,558 | 3/1981 | Burba ..................... 528/45 |
| 4,456,740 | 6/1984 | Holubka et al. ............ 525/528 |
| 4,507,412 | 3/1985 | Hickner et al. ............ 523/454 |
| 4,539,345 | 9/1985 | Hansen . | |
| 4,552,814 | 12/1985 | Cavitt .................... 528/45 |
| 4,753,826 | 6/1988 | Lauman .................. 523/466 |

FOREIGN PATENT DOCUMENTS

| | | |
|---|---|---|
| 024501 | 3/1981 | European Pat. Off. . |
| 024811 | 9/1981 | European Pat. Off. . |
| 3004569 | 8/1981 | Fed. Rep. of Germany . |
| 3232463 | 3/1984 | Fed. Rep. of Germany ........ 528/45 |
| 1420336 | 1/1976 | United Kingdom .............. 528/45 |
| 2056458 | 3/1981 | United Kingdom . |

OTHER PUBLICATIONS

Chatfield, *The Science of Surface Coatings*, pp. 206-207, Ernest Benn Ltd., London 1962.
Dow Liquid Epoxy Resins, form No. 190-244-76, 1976.
Mobay Chemical Corporation, Product Information, C2-43-1, Desmocap 11A, (Product Code D-375).
Mobay Material Safety data sheet, Desmocap 11A, Product Code No. D-375, 1985.
Union Carbide Amines, Product Information, Polyglycoldiamine H-221, 1979.
Union Carbide, Material Safety data sheet, product name: Polyglycoldiamine H-221, 1979.
Cabot, Cab-O-Sil ® N70-TS, Hydrophobic Fumed Silica, 1983.
Cabot, Cab-O-Sil ® Technical Data, Cab-O-Sil ® N70-TS, 1983.
Union Carbide Corporation, Specialty Chemicals Division, Material Safety data sheet, product name: Union Carbide Organofunctional Silane A-1100, 1985.

*Primary Examiner*—C. Warren Ivy
*Attorney, Agent, or Firm*—Seidel, Gonda, Lavorgna & Monaco

[57] ABSTRACT

A cavitation resistant polymer and coating are provided by curing a composition containing from about 24 to 48 wt. % of a liquid epoxy resin, from about 24 to 48 wt. % of a blocked isocyanate prepolymer, from about 4.2 to 12 wt. % of a rheological additive at least 65% of which is an amorphous silica flatting agent, from about 10 to 14 wt. % of a curing agent, from about 1 to 4 wt. % of a plasticizer, and from about 0.1 to 0.6 wt. % of a silane. The composition can contain pigments, fillers and other auxillary agents.

22 Claims, No Drawings

CAVITATION-RESISTANT POLYMER AND COATING

BACKGROUND OF THE INVENTION

This invention relates generally to cavitation-resistant polymer and coating compositions and, in particular, to polymers and coatings that resist the effects of cavitation, especially when applied to propellers, turbines and other mechanical equipment subject to cavitation or other degradative forces.

Cavitation erosion invariably occurs in almost all hydraulic machinery. Generally, cavitation occurs when partial vacuums are formed in a liquid by a swiftly moving body such as a propeller or by high-frequency sound waves. When the head or pressure, acting on water, for example, is reduced to that of vapor pressure (about 1.25 ft absolute head at usual water temperature), flashing of water into vapor (steam) occurs, and voids or cavities form. Under such conditions, slight changes in static pressure or velocity, cause alternate formation and collapse of these cavities, accompanied by an intense local water hammer (the formation of high local momentary pressure). If these cavities collapse on the surface of runner blades or draft tubes, or other such equipment, the pressure generated tends to enter microscopic cracks, causing cavitation erosion (pitting).

Cavitation occurs on a propeller when it revolves faster than water can be supplied to it. The screw then works in a partial vacuum. This may result in marked increase in rpm, slip, and shaft power with little increase in ship speed or effective power. As cavitation develops, noise, vibration, and erosion of the propeller blades, struts, and rudders are experienced. It may occur either on the face or on the back of the propeller. The cavitation bubbles collapse as they move into higher pressure regions toward the trailing edge, causing erosion.

Cavitation and its destructive effects occurs in pumps and turbines due to local pressure drops which generate cavities filled with vapor. These cavities collapse as soon as the vapor bubbles reach regions of higher pressure on their way through the pump. Cavitation may appear along stationary parts of the pump casing or along moving vanes of the impeller. The reduction of the absolute pressure to that of vapor tension may be general (for the whole system) or merely local. The general reduction may be produced by: (1) an increase in the static lift; (2) a decrease in atmospheric pressure; (3) a decrease in the absolute pressure in the system when pumping from a vessel; and (4) an increase in the temperature of liquid. A local decrease in pressure may be caused by dynamic means: (1) an increase in velocity by speeding up the pump; (2) a result of separation and contraction of flow due to a sudden change in direction of flow. The signs of cavitation are: (1) noise and vibration, (2) drop in head-capacity and efficiency curves, and (3) impeller vane pitting. For pumps of low specific speed, the decrease with cavitation in head-capacity characteristics and efficiency is rapid; for medium specific speeds it is more gradual at first and then rapid; for propeller pumps the decrease exists over the whole range of capacity.

Cavitation even occurs in water passages not occupied by steadily flowing water.

To date various means have been proposed to prevent or reduce cavitation and its destructive effects. One approach involves optimizing design. Another involves using cavitation-resisting materials. The metals, for example, most commonly used, in order of their resistance are cast iron, bronze, carbon steel, and stainless steel.

Metallic overlay welding of cavitation resistant weld metals has been found to be a highly successful method for the repair of cavitation damage on hydraulic turbine runners but, this process is costly and time-consuming. Alternatively, a number of compliant polymeric coatings have been used to repair cavitated areas on hydraulic turbine runners.

Space age plastics and alloys, redesign of machines and machine parts, even modification of waterway flow have been tried without lasting effect.

SUMMARY OF THE INVENTION

It has now been found that the degradative and destructive effects of low intensity cavitation and similar destructive forces can be reduced or prevented when surfaces subject to such forces are coated with a unique polymer composition containing a novel rheological additive. The composition comprises from about 24 to 48 wt. % of a liquid epoxy resin, from about 24 to 48 wt. % of a blocked isocyanate prepolymer, from about 4.2 to 12 wt. % of a rheological additive at least 65 wt. % of which is an amorphous silica flatting agent, from about 10 to 14 wt. % of a curing agent for the epoxy resin and the isocyanate, from about 1 to 4 wt. % of a plasticizer, and from about 0.1 to 0.6 wt. % of a surface modifying agent containing silane groups. Generally, at least about 65 to about 70 wt. % of the rheological additive, or from about 3 to about 8 wt. % of the composition/coating of the invention, should be comprised of the amorphous silica flatting agent of this invention. Any other suitable rheological additive can be used in combination with the amorphous silica flatting agent but colloidal silica is preferred.

Optionally the polymer composition and coating of this invention can contain up to about 2 wt. % of pigments to provide visual aid to confirm thorough mixing and up to about 2 wt. % of fillers or auxilliary agents to aid in handling. Preferably, from about 0.4 to 2 wt. % of fillers is used.

The polymer or coating is produced by blending a first and second component of th polymer composition and curing the blend. The first component is a mixture of from about 30 to 60 wt. % of a liquid epoxy resin, from about 30 to 60 wt. % of a blocked isocyanate prepolymer, and from about 4 to 10 wt. % of an amorphous silica flatting agent as a rheological additive. The second component is a mixture of from about 50 to 70 wt. % of the curing agent, from about 5 to 20 wt. % of a plasticizer, from about 0.5 to 3 wt. % of a surface modifying agent, and from about 5 to 20 wt. % of a rheological additive. An amorphous silica flatting agent can be used as the rheological additive in either component, either alone or in admixture with any other suitable rheological agent. Alternatively, the rheological additive in the first component can be composed entirely of the amorphous silica flatting agent while the rheological additive in the second component can be composed entirely of any other suitable rheological additive; colloidal silica is preferred.

Four parts by weight of the first component are blended with one part by weight of the second component and the resulting blend is cured to produce the polymer. When the blend is applied to a surface or substrate and cured thereon, a coating is produced.

In a preferred embodiment, the blended composition comprises about 36.4 wt. % of an epoxy resin; about 36.4 wt. % of a blocked isocyanate prepolymer; about 6.5 wt. % of an amorphous silica flatting agent and about 3.5 wt. % of any other suitable rheological additive, preferably colloidal silica; about 12.84 wt. % of the curing agent, preferably polyglycol diamine; about 2.8 wt. % of a plasticizer, preferably dibutyl phthalate; and about 0.36 wt. % of a surface modifying agent containing silane groups.

It has been found that the compositions, polymers, and coatings of this invention provide unexpected and excellent protection against the degradative effects of cavitation. This protection is all the more surprising since coatings of similar compositions do not similarly withstand such forces. For example, a coating prepared from a composition that differs from those described herein only in that it contains colloidal silica instead of the amorphous silica flatting agents of the present formulations fails to provide the cavitation protection of this invention. It is completely unexpected that such a small difference in the formulation could provide such a drastic improvement in the results.

DETAILED DESCRIPTION OF THE INVENTION

The unique cavitation resistant polymers and coatings of this invention can be formulated by any suitable method. The compositions prepared from the blended components are liquid, having a consistency similar to thick paints or varnishes, and can be applied to any surface or substrate by any suitable means including those commonly used for applying paints and varnishes.

Any suitable liquid epoxy resin can be used to prepare the compositions of the invention provided that at least 50 wt. %, preferably 80 wt. %, most preferably 100% of the liquid epoxy resins used is a bisphenol A-epichlorohydrin epoxy resin. The preferred such resin has an epoxide equivalent weight of 182-190, a viscosity (cps at 25° C.) of 11,000 to 14,000 and a specific gravity (25/25° C.) of 1.16. The most preferred bisphenol A-epichlorohydrin resin is a diglycidyl ether of bisphenol A having the theoretical structure:

"D.E.R. 331," produced by Dow Chemical Corporation, Midland, Mich., is particularly preferred.

Examples of some liquid epoxy resins which can be used in quantities of up to about 50 wt. % of the liquid epoxy resin, preferably up to about 20 wt. % of the bisphenol A-epichlorohydrin resins of this invention, include low viscosity epoxy phenol novolac resins. The preferred such resin has an epoxy value (eq./100 g) of 0.54–0.58, a viscosity (cP at 25° C.) of 30,000 to 50,000 and the theoretical structure:

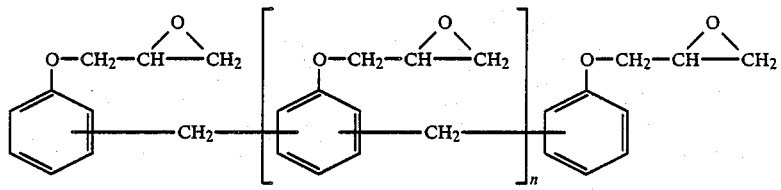

"Epoxy Resin XB 3337" having an epoxy functionality of 2.4 produced by Ciba-Geigy Corporation is particulary preferred.

Any suitable blocked isocyanate prepolymer can be used, particularly alkyl phenol blocked diisocyanates and blocked isocyanate-terminated polyether prepolymers. A preferred alkyl phenol blocked prepolymer is an alkyl phenol blocked toluene diisocyanate having ether and blocked urethane groups. This prepolymer has an empirically determined equivalent weight of 860–1000, a specific gravity at 20° C. of 1.05 and a viscosity at 25° C. of 900± 300 Pa.s. "Desmocap 11A," produced by Mobay Chemical Corporation, Pittsburgh, PA. is particuarly preferred. Another preferred blocked isocyanate is an alkyl phenol blocked toluene diisocyanate polyether prepolymer having a specific gravity at 20° C. of 1.04, an equivalent weight of 2470, a viscosity at 25° C. of 23,000–43,000 cps, and an available isocyanate content of 1.7 wt. %. "Desmocap 12", produced by Mobay Chemical Corporation, is particularly preferred.

For best results, at least about 80 wt. %, preferably 90 wt. % and most preferably 100 wt. % of the blocked isocyanate prepolymer should be comprised of the alkyl phenol blocked toluene diisocyanate prepolymer described above. The remainder of the blocked isocyanate prepolymer can be any blocked isocyanate prepolymer that is compatible with the alkyl phenol blocked toluene diisocyanate and that unblocks under curing conditions.

Any suitable curing agent for the epoxy resin and the isocyanate that reacts to cure those components at about the same rate under the curing conditions described herein can be employed. Generally aliphatic and cycloaliphatic amines such as alkyleneamines are used including diamino-ethers having terminal primary amino groups. Isophorone diamine, 3-aminomethyl-3, 5,

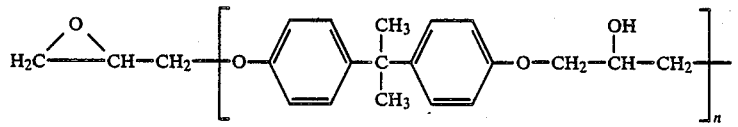

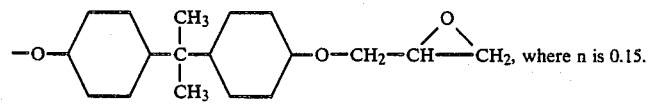

5-trimethylcyclohexylamine, 3, 3' dimethyl-4, 4'-diaminodicyclohexyl methane, polyglycol diamines, and the like can be used either alone or in combination. The most preferred alkyleneamine, referred to herein as polyglycol diamine, has a molecular weight of about 220 and the formula $NH_2CH_2CH_2CH_2O(CH_2CH_2O)_2CH_2CH_2CH_2NH_2$. "Polyglycoldiamine H-221," produced by Union Carbide Corporation, New York, N.Y. is particularly preferred.

Any amorphous silica flatting agent that can act as a suspending agent and aid in viscosity control can be used. Preferred such agents improve the flow and/or provide anti-sag properties to the compositons of the invention, as well as maintain their shelf life, physical properties and liquid character. Amorphous synthetic silica powders are particularly preferred. Such powders having an average particle size of about 0.02 micron with a surface area of about 150 square meters/gram and a bulk density of from about 7-10 pounds/cubic foot have been found to be very satisfactory. An amorphous silica flatting agent that has provided outstanding results contains about 97.5% $SiO_2$ (anhydrous), 0.1% $Fe_2O_3$, 0.6% $Al_2O_3$, 0.07% $TiO_2$, 0.5% CaO, 0.2% MgO, and 1.5% of either NaCl or $Na_2SO_4$ (percents are by weight). LoVel 29, a hydroxylated silicon dioxide of the formula $SiO_2$, marketed by PPG Industries, Pittsburgh, Pa., is particularly preferred as the amorphous silica flatting agent. Lo-Vel 29 is available as a white powder and contains about 97.5% wt. % $SiO_2$ (an hydrous) based on the entire weight of the silica composition.

Any additive that will improve the flow and/or provide anti-sag properties to the compositions of the invention may be used in conjunction with the rheological additive of the invention. Preferably, a colloidal silica or hydrophobic fumed silica particularly surface modified with polymethyl silyl groups is employed. Surface modification is achieved by treating silica with an organosilicon to provide surface methyl groups in addition to surface hydroxyl groups. "Cab-O-Sil N70TS", produced by Cabot Corporation, Tuscola, Ill. is a particularly preferred rheological additive. An organic derivative of a montmorillonite clay, treated with a quaternary ammonium chloride, for example, is also preferred. Most preferred is Bentone SD-2 rheological additive, a super dispersible organoclay thickener, a product of NL Industries, Inc. Hightstown, N.J. Bentone SD-2 is an organic derivative of a montmorillonite clay and available as a finely divided powder.

Any suitable plasticizer may be employed in the composition and coating of this invention. While plasticizers are often thought of as imparting slip to a composition, they in fact promote the adhesion of the compositions and coatings of this invention. Some suitable plasticizers include phthalates such as alkyl benzyl phthalates, benzyl phthalates and dialkyl phthalates. Dibutyl phthalate is preferred.

Any suitable surface modifying agent that contains silane groups and can react with mineral fillers and the reactive materials of the coating to link the filler to the polymer backbone, particularly to the epoxy binder, and to the metal oxide of the substrate being coated, is preferred. Reactive silanes produce stronger compositions and promote adhesion to substrates, particularly metals such as aluminum and steel. Some suitable surface modifying agents that can be used include silanes, particularly organosilane esters known as gamma-aminoalkyltrialkoxysilanes. A preferred silane is gamma-aminopropyl triethoxysilane ($NH_2(CH_2)_3$ Si $(OC_2H_5)_3$) commercially available as "Silane A-1100" from Union Carbide Corporation, New York, N.Y.

Epoxy silanes, amino silanes, or both can be used in conjunction with the liquid epoxy resins, the curing agents, or both to provide the silane function making it unnecessary to employ a separate surface modifying agent reactant. The organo group (epoxy, amino) will react with the organic matrix and the silane will react with the filler and/or the metal oxide surface of the substrate being coated. Some epoxy and amino silanes which can be used include gamma-glycidoxypropyltrimethoxysilane, beta-(3, 4-epoxycyclohexyl)-ethyltrimethoxy silane N-(beta-aminoethyl)-gamma-aminopropyltrimethoxysilane, gamma-aminopropyltriethoxysilane, N'-beta-(aminoethyl)-N-(beta-aminoethyl)-gamma-aminopropyltrimethoxysilane, N-beta (aminoethyl)-gamma-aminopropyltrimethoxysilane, and the like and mixtures thereof. When an epoxy silane and/or amino silane is used, only that quantity is employed which will provide the polymer of the invention with 0.1 to 0.6% silane groups as described herein.

Any suitable auxiliary material, such as fillers, that will aid in the handling of the components or compositions of this invention may be employed but are not necessary for composition utility. Some such materials include talcs, clays, silicas, micas, and the like. A preferred filler is magnesium silicate, particularly that known as "Nytal 400," produced by R. T. Vanderbilt Company, Inc., Norwalk, Conn.

Pigments can be used to provide easy visual confirmation of thorough mixing but are not necessary for composition utility. Any first color pigment can be used in the first component, and any second color pigment can be used in the second component to be blended to produce the polymer composition and coating of the invention. Some suitable pigments include titanium dioxide, especially that commercially available as "R-902 Titanium Dioxide" from The Dupont Company, Wilmington, Delaware; "Sunfast Blue" produced by Sun Chemical Corporation, Cincinnati, Ohio; tetrachloroisoindolinone or Pigment Yellow 109 produced as Irgazin Yellow 2GLTE by Ciba-Geigy Corporation. Yellow pigment in one component and blue in the other will yield a uniform green to indicate thorough mixing.

Although the coating composition of the invention can be applied to any surface that requires protection against any destructive force, particularly cavitation, it is preferred that such surfaces are cleaned and surface contaminants such as scale, dirt, dust, grease, oil, water, or other foreign matter adverse to adhesion or cohesion are removed. The surface should then be roughened using any suitable means such as a grit blast, abrasion wheel, file, sand paper or the like. Generally, the surface is then washed or wiped, preferably with a solvent that leaves no residue, and preferably at least twice, then dried completely. The surface is then coated with any suitable primer such as those well known for priming surfaces such as aluminum, steel, concrete, wood, plastics and the like. A preferred composition contains an epoxy polyamide as the primer compound wherein the epoxy is suitably any of those disclosed herein, particularly the diglycidyl ether of bisphenol A, and the polyamide is the reaction product of dimerized linoleic acid and diethylene triamine having an amine value of 230-246 and a viscosity of 20-42 poise at 75° C. A particularly preferred epoxy primer, is "PM-Epoxit Primer", a product of Palmer International Corporation.

The coating composition of this invention can be applied at any thickness. Two or more coatings of the composition may be used as desired. The coating is cured on the substrate, generally at ambient temperature and pressure, usually from 15° C. to 60° C., preferably 20° C. to 60° C., most preferably 40° C. Typically, pressure is not a consideration and no external pressure is applied. Superior strength, durability and adhesion provides excellent resistance against the degradative effects of cavitation. The coatings of the invention have superior flexibility and elongation and can be power-sanded, ground, or machined forty-eight hours after application. The coatings exhibit virtually no shrinkage during or after cure, repel moisture, and have a tensile adhesion of not less than 1600 psi.

DETAILED DESCRIPTION OF A PREFERRED EMBODIMENT

In the following description all parts and percentages are by weight unless otherwise specified.

To produce a preferred polymer composition and coating of this invention, two separate components are first prepared. The first component contains 45.5 parts of a bisphenol A-epichlorohydrin liquid epoxy resin having an epoxide equivalent weight of 182–190 and a viscosity of 11,000 to 14,100, 45.5 parts of an alkyl phenol blocked toluene diisocyanate having an equivalent weight of 860–1000, 0.4 parts of titanium dioxide pigment, and 8.6 parts of an amorphous silica powder flatting agent containing 97.5% anhydrous $SiO_2$ with an average particle size of 0.02 microns as described above. These materials can be mixed using any automatic mixing and dispensing equipment currently available as well as standard paste mixing equipment such as a double arm mixer, planatary mixer, or dough mixer, until thoroughly blended. Mixing time may be varied as desired but from about 30 to 45 minutes is usually adequate.

The second component contains 64.2 parts of $NH_2CH_2CH_2CH_2O(CH_2CH_2O)_2CH_2CH_2CH_2NH_2$, 14 parts of dibutyl phthalate, 1.8 parts of gamma-aminopropyl triethoxysilane, 3.6 parts of magnesium silicate, 15.5 parts of colloidal silica, and 0.9 parts of Sunfast Blue pigment. These materials can be mixed together in any standard mixing equipment as described above until thoroughly blended; about 30 to about 45 minutes is usually adequate.

The two components are combined immediately before the novel polymer composition of this invention is to be applied. At such time, four parts by weight of the first component are mixed with one part by weight of the second component until thoroughly blended as indicated by a uniform light blue color. Any standard mixing equipment as described above can be used.

The composition is a liquid with the consistency of a thick paint having a pot life of about 40 minutes during which time it can be applied using any suitable means, such as a brush, to the surface to be coated. A thickness of from about 30 mils to about 100 mils per layer of coating is generally adequate. An applied thickness of about 50 mls is "set" in about four hours at ambient temperature and is fully cured in about ninety-six hours.

The unexpectedly superior effectiveness of the coating compositions of this invention in protecting surfaces from degradative forces, particularly low intensity cavitation, can be demonstrated by comparing results obtained when cavitation tests are conducted in accordance with ASTM G-32-85.

A dozen carbon steel (ASTM A-36) cavitation buttons are prepared in accordance with the ASTM G-32 standard specification. The top surface of each button is cleaned and surface contaminants are removed as described herein. A primer, PM-Epoxit Primer, is used preparatory to coating each button with the composition described above. The primary coating is cured at 70° F. for twenty-four hours. Subsequently, two layers of the composition described above are applied on six buttons and the remaining buttons are coated with a similar composition except that colloidal silica (CAB-O-SIL N70TS) is substituted in the same quantity for the Lo-Vel 29 contained in the composition. The coated buttons are cured at 75° F. for ninety-six hours.

The test specimens are vibrated in a beaker filled with distilled water and maintained at 75° F. These specimens are tested at a peak-to-peak amplitude of 0.001 inch (low intensity test). The results show that the sample containing the unique flatting agent of this invention suffers only one-third the cavitation damage of the samples containing colloidal silica. Test results further show that the coatings of this invention resist low intensity cavitation 5.5 times better then carbon steel.

Adhesion tests are carried out on test specimens prepared as described in ASTM test C633 (cohesive strength and D1002 (shear strength).

The bonding surfaces of the specimens are cleaned and surface contaminants are removed as described herein. The prepared surfaces are coated with the primer and layers of coatings as described above. The mating surfaces of the specimens are joined and the test specimens are cured at 75° F. for ninety-six hours. After the specimens are completely cured, excess coating is trimmed from the edges using a sharp knife. The edges are smoothed using a fine emory cloth.

Adhesion testing is conducted using a tensile testing machine. Tensile load is applied to each test specimen at a constant rate of cross head travel (0.05 inches per minute) until failure. Although the coatings of this invention failed the cohesive strength at 700 psi and the lap shear adhesion test at 1035 psi, thus demonstrating a low level of cohesive strength, they nevertheless demonstrate high resistance to low intensity cavitation forces. It is quite surprising that a coating which has a low cohesive strength nevertheless provides good resistance to low intensity cavitation.

Accordingly, the coatings prepared from the polymers of this invention are suitable for protecting hydraulic machinery against the forces of low intensity cavitation. They are also useful for repairing cavitated areas on hydraulic machinery such as turbine runners, propellers, and the like during maintenance and use. The polymers and coatings of this invention are particularly useful for making repairs in situ.

The present invention may be embodied in other specific forms without departing from the spirit or essential attributes thereof and, accordingly, reference should be made to the appended claims, rather than to the foregoing specification, as indicating the scope of the invention.

We claim:

1. A cavitation resistant composition comprising from about 24 to 48 wt. % of a liquid epoxy resin, from about 24 to 48 wt. % of a blocked isocyanate prepolymer, from about 4.2 to 12 wt. % of a rheological additive, from about 10 to 14 wt. % of a curing agent for the epoxy resin and the isocyanate, from about 1 to 4 wt. % of a plasticizer, and from about 0.1 to 0.6 wt. % of a surface modifying agent containing silane groups, wherein at least about 65 wt. % of the rheological additive is comprised of an amorphous silica flatting agent.

2. The composition of claim 1 containing from about 3 to about 12 wt. % amorphous silica flatting agent, based on the composition weight.

3. The composition of claim 1 containing from about 3 to about 8 wt. % amorphous silica flatting agent, based on the composition weight.

4. The composition of claim 1 comprising about 36.4 wt. % of the epoxy resin, about 36.4 wt. % of the blocked isocyanate prepolymer, about 6.5 wt. % of the amorphous silica flatting agent and 3.5 wt. % of a rheological additive other than amorphous silica flatting agent, about 12.84 wt. % of the curing agent, about 2.8 wt. % of the plasticizer, and about 0.36 wt. % of the surface modifying agent.

5. The composition of claim 1 containing a member selected from the group consisting of pigments, fillers, and mixtures thereof.

6. The composition of claim 5 containing up to about 2 wt. % pigment and up to about 2 wt. % magnesium silicate.

7. The composition of claim 1 wherein the amorphous silica flatting agent contains 97.5 wt. % $SiO_2$ (anhydrous).

8. The composition of claim 7 wherein the amorphous silica flatting agent has an average particle size of about 0.02 microns, a surface area of about 150 square inches/gram, and a bulk density of about 7-10 pounds/cubic foot.

9. A cavitation resistant coating comprising the reaction product of from about 24 to 48 wt. % of a liquid epoxy resin, from about 24 to 48 wt. % of a blocked isocyanate prepolymer, and from about 10 to 14 wt. % of a curing agent for the epoxy resin and the isocyanate; and from about 4.2 to 12 wt. % of a rheological additive at least 65 wt. % of which is an amorphous silica flatting agent, from about 1 to 4 wt. % of a plasticizer, from about 0.1 to 0.6 wt. % of a surface modifying agent containing silane groups, and auxiliary agents to aid in handling.

10. The coating of claim 9 wherein the epoxy resin is a diglycidyl ether of bisphenol A, the blocked isocyanate is an alkyl phenol blocked toluene diisocyanate, the curing agent is an alkyleneamine having the formula $NH_2CH_2CH_2CH_2O(CH_2CH_2O)_2CH_2CH_2CH_2NH_2$, the plasticizer is dibutyl phthalate, the surface modifying agent is gamma-aminopropyltriethoxysilane, and the auxiliary agent is magnesium silicate.

11. The coating of claim 9 wherein the amorphous silica flatting agent contains 97.5 wt. % $SiO_2$ (anhydrous).

12. The coating of claim 11 wherein the silica flatting agent has an average particle size of about 0.02 microns, a surface area of about 150 square inches/gram, and a bulk density of about 7-10 pounds/cubic foot.

13. A cavitation resistant polymer comprising the reaction product of from about 24 to 48 wt. % of a liquid epoxy resin, from about 24 to 48 wt. % of a blocked isocyanate prepolymer, and from about 10 to 14 wt. % of a curing agent for the epoxy resin and the isocyanate; and from about 4.2 to 12 wt. % of a rheological additive at least 65 wt. % of which is an amorphous silica flatting agent, from about 1 to 4 wt. % of a plasticizer, from about 0.1 to 0.6 wt. % of a surface modifying agent containing silane groups, and auxiliary agents to aid in handling.

14. The polymer of claim 13 wherein the epoxy resin is a diglycidyl ether of bisphenol A, the blocked isocyanate is an alkyl phenol blocked toluene diisocyanate, the curing agent is an alkyleneamine having the formula $NH_2CH_2CH_2CH_2O(CH_2CH_2O)_2CH_2CH_2CH_2NH_2$, the plasticizer is dibutyl phthalate, the surface modifying agent is gamma-aminopropyltriethoxysilane, and the auxiliary agent is magnesium silicate.

15. The polymer of claim 13 wherein the amorphous silica flatting rheological additive contains 97.5 wt. % $SiO_2$ (anhydrous).

16. The polymer of claim 15 wherein the amorphous silica flatting agent has an average particle size of about 0.02 microns, a surface area of about 150 square inches/gram, and a bulk density of about 7-10 pounds/cubic foot.

17. A method for producing a cavitation resistant coating which comprises:
(a) preparing a first portion by mixing from about 30 to 60 wt. % of a liquid epoxy resin, from about 30 to 60 wt. % of a blocked isocyanate prepolymer, and from about 4 to 10 wt. % of an amorphous silica flatting agent to produce a first portion of said coating;
(b) preparing a second portion by mixing from about 50 to 70 wt. % of a curing agent for the epoxy resin and the isocyanate, from about 5 to 20 wt. % of a plasticizer, from about 0.5 to 3 wt. % of a surface modifying agent containing silane groups, and from about 5 to 20 wt. % of a rheological additive to produce a second portion of said coating;
(c) mixing four parts by weight of the first portion of said coating with one part by weight of the second portion of said coating to produce a coating composition;
(d) applying the composition to a surface; and
(e) curing the composition to produce the coating.

18. The method of claim 17 wherein the first portion comprises about 45.50 wt. % of the epoxy resin, about 45.50 wt. % of the blocked isocyanate prepolymer, and about 8.60 wt. % of the amorphous silica flatting agent; the second portion comprises about 64.20 wt. % of the curing agent, about 14.00 wt. % of the plasticizer, about 1.80 wt. % of the surface modifying agent, and about 15.50 wt. % of a rheological additive.

19. The method of claim 17 wherein the portions contain a member selected from the group consisting of pigments, mineral fillers, and mixtures thereof.

20. The method of claim 17 wherein the composition is cured at ambient temperature.

21. The method of claim 17 wherein the epoxy resin is a diglycidyl ether of bisphenol A, the blocked isocyanate is an alkyl phenol blocked toluene diisocyanate, the curing agent is an alkylene amine having the formula $NH_2CH_2CH_2CH_2O(CH_2CH_2O)_2CH_2CH_2CH_2NH_2$, the amorphous silica flatting agent contains about 97.5 wt. % $SiO_2$ (anhydrous) and has an average particle size of about 0.02, the plasticizer is dibutyl phthalate, the surface modifying agent is gamma-aminopropyltriethoxysilane, and the second portion contains magnesium silicate.

22. The method of claim 17 wherein the surface to which the composition is applied is coated with a primer.

* * * * *

UNITED STATES PATENT AND TRADEMARK OFFICE
CERTIFICATE OF CORRECTION

PATENT NO. : 4,847,122

DATED : July 11, 1989

INVENTOR(S) : Daniel Goldberg, et al

It is certified that error appears in the above-identified patent and that said Letters Patent is hereby corrected as shown below:

Col 9, line 31 delete "inches" and insert --meters--;
line 58 delete "inches" and insert --meters--;

Col 10, line 16, delete "inches" and insert --meters--;

Signed and Sealed this

Twenty-seventh Day of April, 1993

Attest:

MICHAEL K. KIRK

Attesting Officer

Acting Commissioner of Patents and Trademarks